(12) United States Patent
Tuck, III et al.

(10) Patent No.: US 6,763,394 B2
(45) Date of Patent: Jul. 13, 2004

(54) VIRTUAL EGRESS PACKET CLASSIFICATION AT INGRESS

(75) Inventors: Russell R. Tuck, III, San Jose, CA (US); Puneet Agarwal, San Francisco, CA (US)

(73) Assignee: Pluris, Inc., Cupertino, CA (US)

(*) Notice: Subject to any disclaimer, the term of this patent is extended or adjusted under 35 U.S.C. 154(b) by 422 days.

(21) Appl. No.: 09/935,444

(22) Filed: Aug. 22, 2001

(65) Prior Publication Data

US 2003/0053474 A1 Mar. 20, 2003

(51) Int. Cl.[7] .......................... G06F 13/00; H04L 12/56; H04Q 11/04
(52) U.S. Cl. ................... 709/238; 370/392; 370/389
(58) Field of Search ..................... 709/238; 370/392, 370/389

(56) References Cited

U.S. PATENT DOCUMENTS 5,721,819 A * 2/1998 Galles et al. .............. 709/243
5,996,021 A * 11/1999 Civanlar et al. ........... 709/238
6,385,209 B1 * 5/2002 Skirmont et al. .......... 370/419
6,538,991 B1 * 3/2003 Kodialam et al. ......... 370/229
6,584,071 B1 * 6/2003 Kodialam et al. ......... 370/238
6,628,609 B2 * 9/2003 Chapman et al. .......... 370/229

* cited by examiner

Primary Examiner—Krisna Lim
(74) Attorney, Agent, or Firm—Donald R. Boys; Central Coast Patent Agency, Inc.

(57) ABSTRACT

In a network packet router having one or more ingress and egress ports, a method is implemented at an ingress port for egress pass/drop determination for packets, comprising the steps of (a) noting header combinations and values, and egress port destination for incoming packets; (b) comparing the header combinations and values with rule sets associated with the header combinations and values including egress port identities, and (c) returning a determination of pass or drop for the packet.

24 Claims, 3 Drawing Sheets

| Fields | | | | Pass/Drop |
|---|---|---|---|---|
| A | B | C | D | |
| e | f | g | h | 0 |
| e | f | j | h | 1 |
| ⋮ | ⋮ | ⋮ | ⋮ | |
| m | f | * | h | 0 |
| e | * | g | k | 1 |
| l | m | n | o | 1 |

* = wild card, any value will do

1 = Pass
0 = Drop

*Fig. 1 (Prior Art)*

Fields: A B C D
Egress Port
Pass/Drop

| A | B | C | D | Egress Port | Pass/Drop |
|---|---|---|---|---|---|
| l | m | n | o | (1) | 0 |
| l | m | p | o | (2) | 1 |
| l | m | n | q | (3) | 0 |
| m | n | * | p | (1) | 0 |
| * | n | l | q | (2) | 1 |
| q | r | s | t | (3) | 1 |

Values

* = wild-card, any value will do

1 = Pass
0 = Drop

*Fig. 2*

Content-Addressable Memory

\* wild card - any value is acceptable

VIRTUAL EGRESS PACKET CLASSIFICATION AT INGRESS

FIELD OF THE INVENTION

The present invention is in the field of routing digital data over a data-packet-network (DPN) and pertains more particularly to methods and apparatus for classifying packets to determine routing requirements.

BACKGROUND OF THE INVENTION

In the art of routing digital data through data-packet networks, research and development of methods for more efficient handling of data packets continues. Generally speaking, a data packet is a digitized and organized block of binary data that is a "packaged" portion of a specific communication or data transfer from a source location to an ultimate destination on a network. A data packet typically has one or more headers, and a data body. The packet headers are used for data routing through the network. During routing from a source location to a routed destination, data packets may be processed at one or more stops or routing points along the way. These hops, as they are often termed, are between data routers and, in some cases, server nodes distributed through the network. Data packets are, for example, commonly routed over the Internet network and commonly include Internet Protocol (IP) headers and Transmission Control Protocol (TCP) headers. It is well-known in the routing art that there are typically several hops for a packet between a source and a destination. It is also well-known that there are industry-accepted and applied procedures and protocols in routing, so that the many parts of the Internet (for example) will continue to operate seamlessly, even though hardware and software from many different sources and companies is used. Further, the procedures by which routers function involve many internal processes and messages between routers. For example, to operate successfully every router needs to keep track of its own position in the overall network, the position and functioning characteristics of its nearest neighbors, the output (egress) ports by which it must transmit packets previously received at input (ingress) ports to be sure the packets follow a best route to the final destination, and so on.

A router typically has more than one ingress port and more than one egress port. The ports are often organized so each specific port functions for both ingress and egress. For descriptive purposes, however, it is quite useful to treat ingress and egress ports as separate entities, because they are logically separate and are often implemented as separate entities. A packet received at any ingress port is pre-processed at that port by, for example, checking the header information for type, source and destination, port numbers, and so forth, and determining which of potentially many rules and processes apply, and then processing the packet by applying the determined procedures. Some packets may be data packets for such as a video stream or a Web page, for example, which may be processed by re-transmitting them at whatever egress port is determined to be coupled to the next node to which they should go on the way to the final destination. Other packets may be determined to be queries from a neighboring router, which may be diverted to a CPU for a subsequent answer to be prepared and sent back to the neighbor. There are many possibilities, and every packet must be processed so a determination can be made, and the correct action taken.

One of the functions in the art that routers practice on packets has to do with a quick decision to pass a packet on to further processing, or to simply drop the packet. This function in the state-of-the-art takes place at both ingress and egress ports. There are a variety of reasons that an incoming packet received at an ingress port might be dropped. For example, packets of an unknown type, which may be michevious, should not be processed. As another simple example, packets that have a destination that cannot be reached according to current routing tables can be dropped, because they cannot go anywhere anyway. There are a number of other possibilities well-known in the art.

There are also a variety of reasons why packets at an egress port might need to be dropped, even though they have been accepted and processed in the router, and have arrived at an egress port. There may be, for example, requests from certain organizations for receiving only packets meeting certain criteria. There are a number of other reasons for dropping packets at output ports well-known in the art. In many cases the reasons for pass and drop are port specific.

A typical way that pass/drop determination is made at either ingress or egress is by matching certain fields from a packet with fields in an Access Control List (ACL). The ACL is simply a lookup mechanism for matching the fields and returning a bit determined by the match (or mismatch) to pass (further process or transmit) or drop the packet. The implementation of such ACLs is described further in this specification in the section entitled "Description of the Preferred Embodiments" below.

Because the reasons for dropping at ingress or at egress ports may differ, it makes good sense in the art to implement ingress pass/drop determinations separately from egress pass/drop determinations. Still, doing the determination to pass or drop requires the mechanisms to accomplish the function. That is, to do an ACL lookup and return a bit every ingress port and egress port must have the hardware and/or software to do so. Typically hardware implementation is preferred for speed.

Because of the additional complexity, latency and expense of doing pass/drop determination at both ingress and egress, some manufacturers may prefer to implement the ACL pass/drop function at only ingress ports, and to forego implementing the function at egress. Until the present invention this would mean not having the function at all at the egress ports.

What is clearly needed is a method and apparatus that enables a router or server to accomplish both ingress and egress pass/drop functionality at ingress ports, obviating the need for the mechanisms to accomplish the function at egress ports.

SUMMARY OF THE INVENTION

In a preferred embodiment of the invention, in a network packet router having one or more ingress and egress ports, a system implemented at an ingress port for egress pass/drop determination for packets is provided, comprising a rule set comprising header combinations and values for which a pass/drop decision may be applied, the set including an egress port identity for each header combination and value set, and a mechanism noting pertinent headers of a specific incoming packet, and an egress port to which the packet is to be sent, comparing the headers with rules in the rule set, and returning a determination of a rule to be applied.

In some embodiments of the invention the rule set association takes the form of a lookup table, and the rule returned may determine the pass or drop for the packet. Certain preferred embodiments are capable of implementation in the Internet.

In some cases there is a second lookup table for accomplishing ingress rule determinations without egress port numbers. Also in some embodiments there is a content addressable memory (CAM) used for header combination matches, and pass/drop is determined by the address location of any match. In some embodiments of the system there are two sections in the CAM, and pass or drop is determined by the section of the CAM wherein a content match is found. In some other embodiments the CAM is divided into more than two sections, and a result or action is associated with each section.

In another aspect of the invention, in a network packet router, an ingress port is provided, comprising an interface for receiving packets, a first mechanism for noting header combinations and values, and egress ports for transmission, for individual ones of the received packets, and a second mechanism comparing the headers and values with a rule set comprising header combinations and values and egress ports, and returning a rule for the packet.

In some embodiments the rule returned is a pass or drop determination for the packet. Also in some embodiments the rule set association is in the form of a lookup table. Further the network may be the Internet. In some embodiments there may be a second rule set association for accomplishing ingress rule determinations without egress port numbers. Also in some embodiments a content addressable memory (CAM) is used for header combination matches, and an associated rule is determined by the address location of any match. The CAM may be divided into two sections, and a pass or drop determination is determined by the section wherein the address lies for the content match. In some embodiments the CAM is divided into more than two sections, and a result or action is associated with each section.

In yet another aspect a network packet router is provided, comprising one or more ingress ports, and one or more egress ports. The router is characterized in that individual ones of the ingress ports comprise a first mechanism for noting header field combinations and values, and egress ports for transmission, for individual ones of the received packets, and a second mechanism comparing the headers with rules associated with the egress ports and field values, and returning a rule determination for the packet.

In some embodiments of the router the rule returned determines pass or drop for the associated packet, and in some embodiments the rule set association takes the form of a lookup table. The network may be the Internet. In some cases there may be a second rule set association for accomplishing ingress pass/drop determinations without egress port numbers. Also in some cases a content addressable memory (CAM) is used for header combination matches, and a rule is determined by the address location of any match. The CAM may be divided into two sections, and a pass or drop determination is determined by the section wherein the address lies for the content match. Further, in some cases the CAM is divided into more than two sections, and a result or action is associated with each section.

In yet another aspect of the invention, in a network packet router having one or more ingress and egress ports, a method implemented at an ingress port for determining both ingress and egress rules for packets is provided, comprising the steps of (a) noting header combinations and values, and egress port destination for incoming packets; (b) comparing the header combinations and values and egress port destinations with a rule set associated with the header combinations and values including egress port destinations; and (c) returning a rule for the packet.

In preferred embodiments, in step (c), the rule returned indicates pass or drop for the associated packet. Also, in some preferred embodiments the rule set associations take the form of a lookup table. The network may be the Internet.

In some embodiments of the method there is a second lookup in a separate rule set association for accomplishing ingress rule application determinations without egress port numbers.

In some embodiments a content addressable memory (CAM) is consulted for rule set matches, and a rule is determined by the address location of any match. The CAM may be divided into two sections, and pass or drop is then determined by the section wherein the address is found for a content match. In some cases the CAM is divided into more than two sections, and each section is associated with a different result or action.

In embodiments of the invention described in enabling detail below, for the first time a system and method is provided wherein egress port pass/drop determinations may be made at ingress.

BRIEF DESCRIPTION OF THE DRAWING FIGURES

FIG. 1 is a simplified diagram representing an Access Control List (ACL) lookup in the prior art.

FIG. 2 is a simplified diagram representing an Access Control List in an embodiment of the present invention.

DESCRIPTION OF THE PREFERRED EMBODIMENTS

Figure 3:
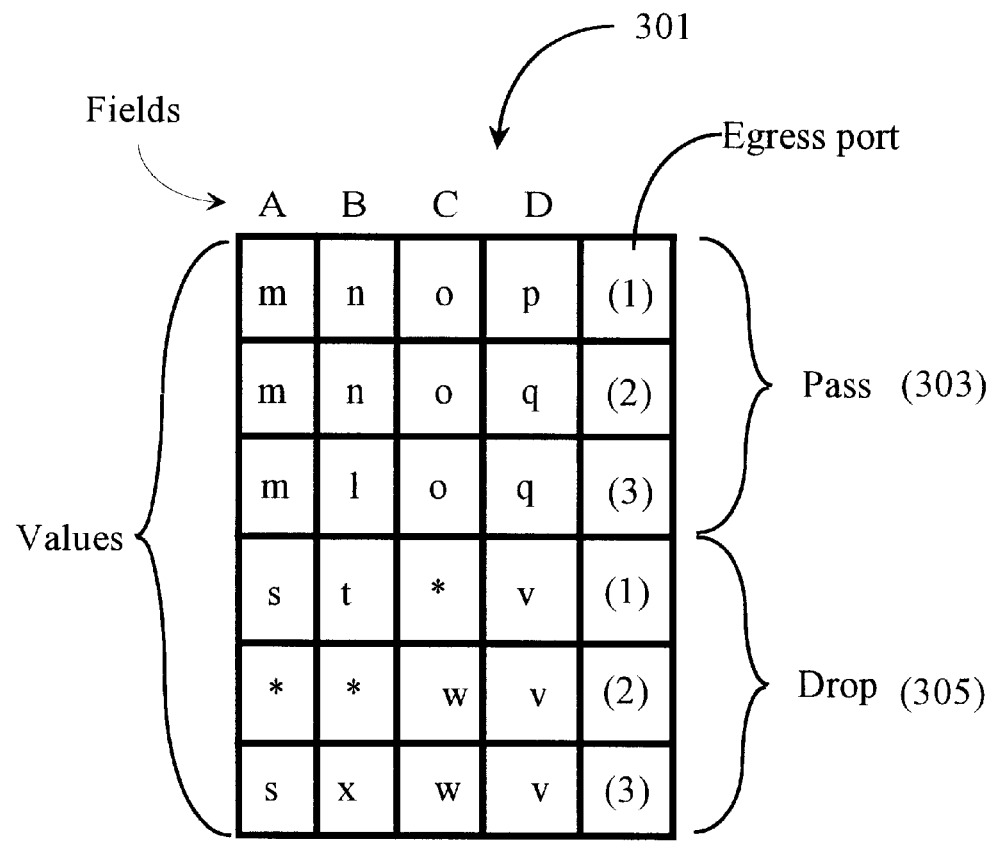
FIG. 3 is a diagram representing a content-addressable memory in an embodiment of the present invention.

FIG. 1 is a simplified diagram representing an Access Control List (ACL) lookup in the prior art. The usual process is, for each packet received, to match certain field values from the packet with a list of field values in the table. A value or values associated with the matching entry is returned, and the packet is processed accordingly. A pass or drop indication is normally part of the returned value. While multiple uses may be made of the result at ingress, including for example class of service, at egress it is common to return only a pass or drop indication. In FIG. 1, a, for pass or drop purposes, a 1 or a 0 is returned for the set of values, and the packet is passed on for further processing or dropped accordingly. There are a variety of ways the ACL may be implemented, with preference typically given to hardware as a faster solution. Further, essentially the same mechanism typically is used at both ingress and egress ports.

In FIG. 1 the column in the ACL for field values shows four fields represented by capital letters A–D. This is exemplary only, as the fields and the patterns can vary according to, for example, packet type, and according to purpose for the rules to be applied. In this example the letters A, B C, D indicate particular fields, and not the values for those fields. The values in the fields are indicated as lower-case letters in the field columns. As indicated in FIG. 1, an asterisk is a wild-card, and any value will do. The particular fields and the values can be anything within reason, dictated by the kinds of fields available in different sorts of packets, and the rules that one may wish to apply. IP packets, as a simple example, have fields for source address, source port, destination address and destination port, and these may well be the fields that would need to be checked in many instances to apply a rule. For other packets and other needs, different fields and values may be used.

As was discussed briefly in the Background section above, a cost saving may be had for the router by implementing pass/drop functionality at only ingress ports, with the tradeoff of a loss in egress function. Theoretically the same cost saving may be had for implementing only at egress, but then all packets have to be processed, even though a certain percentage will be dropped, which is quite inefficient. A further advantage for doing all pass/drop functions at ingress is that no packets will then be processed in the router that will be dropped at egress.

FIG. 2 illustrates a new ACL according to an embodiment of the present invention. In this lookup, implemented only at ingress ports, the same field-matching function is performed as shown in FIG. 1, and an additional column is added for the egress port to which an incoming packet will be sent. This requires that a forwarding lookup for egress port be made prior to the ACL lookup. The forwarding lookup is a consultation of forwarding tables to determine which egress port is the proper port for sending a packet along toward its destination. A match for both the field values and the egress port now is required to return a pass/drop determination. This allows all functionality to be implemented at the ingress ports, and there is no loss of functionality at egress ports. In a preferred embodiment there is some leeway in the order of operations. There are some good reasons for doing the ingress and egress pass/drop lookups separately, although they could be combined in some embodiments.

Page: 9

For example, because the rules are often independent, combining the rules in a single table requires multiplying them to generate all the combinations
which wastes a lot of table space and might make the rules not fit in the table.

In a preferred embodiment therefore, the ingress and egress lookups, both performed at the ingress ports, are performed separately. The ingress lookup in this case may be done either before or after the forwarding lookup, but the egress pass/drop lookup must be done after the forwarding lookup, because the egress port must be known.

In the case of the egress pass/drop lookup, a specific header match may be a pass for some egress ports, and a drop for others. In FIG. 2 it is assumed that there are three egress ports. The figure is therefore drawn showing a specific header set with three port indications, showing that a pass/drop entry (line) is implemented in a preferred embodiment for each field match of interest for each egress port.

With an ACL according to the present invention, all pass/drop functionality occurs at ingress, and the mechanisms at egress are no longer necessary, without any loss in functionality.

In a preferred embodiment of the present invention a mechanism is provided for ACL lookups incorporating a content-addressable memory. A content-addressable memory is known in the art as a memory for which a lookup is done by using the content one wishes to match, in this case the field values for an incoming packet, rather than addresses.

FIG. 3 is a simplified diagram of a block 301 of content-addressable memory (CAM) divided into two sections 303 and 305. The lines of memory are the header values and egress port numbers for which a pass or drop determination needs be made. In this example the memory is entered with the header values and port numbers, and pass or drop is a matter of in which section of memory, 303 or 305, the match is made. In alternative embodiments the CAM may be divided into more than two sections allowing more than just pass or drop determination to be made.

The inventor is aware that there are a variety of options in implementation. One might, for example, implement the pass/drop lookups so that only pass (or drop) combinations of header values are implemented in the lookup table, and the opposite is assumed if no match is found. There are also a variety of alterations that may be made in the embodiments of the invention thus far described without departing from the spirit and scope of the invention, so the invention should be accorded the scope of the claims which follow:

What is claimed is:

1. In a network packet router having one or more ingress and egress ports, a system implemented at an ingress port for egress pass/drop determination for packets, comprising:
    a rule set comprising a first lookup table including header combinations and values for which a pass/drop decision may be applied, the set including an egress port identity for each header combination and value set;
    a second lookup table for accomplishing ingress rule determinations without egress port numbers; and
    a mechanism noting pertinent headers of a specific incoming packet, and an egress port to which the packet is to be sent, comparing, in the fast and second lookup tables, the headers with rules in the rule set, and returning a determination of a rule to be applied.

2. The system of claim 1 wherein the rule returned determines pass or drop for the packet.

3. The system of claim 1 wherein the network is the Internet.

4. The system of claim 1 wherein a content addressable memory (CAM) is used for header combination matches, and pass/drop is determined by the address location of any match.

5. The system of claim 4 wherein the CAM is divided into more than two sections, and a result or action is associated with each section.

6. The system of claim 1 comprising two sections in the CAM, and wherein pass or drop is determined by the section of the CAM wherein a content match is found.

7. In a network packet router, an ingress port, comprising:
    an interface for receiving packets;
    a first mechanism for noting header combinations and values, and egress ports for transmission, for individual ones of the received packets; and
    a second mechanism comparing the headers and values with a rule set comprising header combinations and values and egress ports, and returning a rule for the packet;
    wherein the rule set association is in the form of a lookup table and a second lookup table is provided for accomplishing ingress rule determinations without egress port numbers.

8. The ingress port of claim 7 wherein the rule returned is a pass or drop determination for the packet.

9. The ingress port of claim 7 wherein the network is the Internet.

10. The ingress port of claim 7 wherein a content addressable memory (CAM) is used for header combination matches, and an associated rule is determined by the address location of any match.

11. The ingress port of claim 10 wherein the CAM is divided into two sections, and a pass or drop determination is determined by the section wherein the address lies for the content match.

12. The ingress port of claim 10 wherein the CAM is divided into more than two sections, and a result or action is associated with each section.

13. A network packet router comprising:

one or more ingress ports; and one or more egress ports;

characterized in that individual ones of the ingress ports comprise a first mechanism for noting header field combinations and values, and egress ports for transmission, for individual ones of the received packets, and a second mechanism including a first lookup table for comparing the headers with rules associated with the egress ports and field values, and returning a rule determination for the packet, and a second lookup table is provided for accomplishing ingress pass/drop determinations without egress port numbers.

14. The router of claim 13 wherein the rule returned determines pass or drop for the associated packet.

15. The router of claim 13 wherein the network is the Internet.

16. The router of claim 13 wherein a content addressable memory (CAM) is used for header combination matches, and a rule is determined by the address location of any match.

17. The packet router of claim 16 wherein the CAM is divided into two sections, and a pass or drop determination is determined by the section wherein the address lies for the content match.

18. The router of claim 16 wherein the CAM is divided into more than two sections, and a result or action is associated with each section.

19. In a network packet router having one or more ingress and egress ports, a method implemented at an ingress port for determining both ingress and egress rules for packets, comprising the steps of:

(a) noting header combinations and values, and egress port destination for incoming packets;

(b) comparing, in a first lookup table, the header combinations and values and egress port destinations with a rule set associated with the header combinations and values including egress port destinations; and (c) returning a rule for the packet;

(d) comparing, in a second lookup table, a separate rule set association for accomplishing ingress rule application determinations without egress port numbers; and (e) returning a rule for the packet as a result of step (d).

20. The method of claim 19 wherein, in step (c), the rule returned indicates pass or drop for the associated packet.

21. The method of claim 19 wherein the network is the Internet.

22. The method of claim 19 wherein, in step (b), a content addressable memory (CAM) is consulted for rule set matches, and a rule is determined by the address location of any match.

23. The method of claim 22 wherein the CAM is divided into two sections, and pass or drop is determined by the section wherein the address is found for a content match.

24. The method of claim 22 wherein the CAM is divided into more than two sections, and each section is associated with a different result or action.

* * * * *

UNITED STATES PATENT AND TRADEMARK OFFICE
CERTIFICATE OF CORRECTION

PATENT NO.     : 6,763,394 B2  
DATED          : July 13, 2004  
INVENTOR(S)    : Russell R. Tuck, III It is certified that error appears in the above-identified patent and that said Letters Patent is hereby corrected as shown below:

<u>Column 6,</u>  
Line 22, currently reads: "be sent, comparing, in the fast and second lookup" should read -- be sent, comparing, in the first and second lookup --

Signed and Sealed this

Seventeenth Day of August, 2004

JON W. DUDAS  
*Acting Director of the United States Patent and Trademark Office*